United States Patent
Cumbee et al.

(10) Patent No.: US 10,272,365 B2
(45) Date of Patent: Apr. 30, 2019

(54) MULTI-PHASE EMULSION SEPARATOR WITH DIRECTED FLOW CHANNELS

(71) Applicants: Randy J. Cumbee, Elk City, OK (US); Adrian K. Laster, Pyote, TX (US)

(72) Inventors: Randy J. Cumbee, Elk City, OK (US); Adrian K. Laster, Pyote, TX (US)

(*) Notice: Subject to any disclaimer, the term of this patent is extended or adjusted under 35 U.S.C. 154(b) by 140 days.

(21) Appl. No.: 15/671,943

(22) Filed: Aug. 8, 2017

(65) Prior Publication Data

US 2019/0046899 A1    Feb. 14, 2019

(51) Int. Cl.
*C02F 1/40* (2006.01)
*E21B 43/34* (2006.01)
(Continued)

(52) U.S. Cl.
CPC .......... *B01D 17/0211* (2013.01); *B01D 19/00* (2013.01); *B01D 21/0003* (2013.01); *B01D 21/003* (2013.01)

(58) Field of Classification Search
CPC ............ B01D 21/0087; B01D 21/0003; B01D 21/003; B01D 21/0036; B01D 21/2494;
(Continued)

(56) References Cited

U.S. PATENT DOCUMENTS 1,516,132 A   11/1924  Allen
2,179,131 A   11/1930  Millard
(Continued)

FOREIGN PATENT DOCUMENTS

EP   0013499 A1   7/1980
EP   0026122 A1   4/1981
WO   199940993 A1   8/1999

OTHER PUBLICATIONS

Satpute, Ajay S.; Sizing Spreadsheet for 2/3 phase and vertical/horizontal separator sizing; retrieved on Jun. 19, 2017 from http://files.engineering.com/download.aspx?/folder=3ffc025a-f2b5-43f4-badd-de91fbde503b%26file%3DSeparator_Sizing_Spreadsheet.xls.
(Continued)

*Primary Examiner* — Thuan D Dang
(74) *Attorney, Agent, or Firm* — Robert H. Frantz

(57) ABSTRACT

A well flow separator vessel having a sediment chamber at the inlet end of the vessel with a knock-down billet, followed by a coalescer and a first horizontal flow path between an upper horizontal divider and a lower horizontal divider extending the cylinder length from the sediment chamber towards the distal end of the vessel. At the far end of the first flow path, gasses are received through a scrubber/demister into a second horizontal flow path between the upper horizontal divider and the top side of the vessel, also extending the cylinder length, except directing flow in the reverse direction back towards the inlet end of the vessel towards a gas outlet. Also at the far end of the first flow path, combined liquids fall into a third horizontal flow path between the lower horizontal divider and the bottom side of the body extending the cylinder length towards the inlet end of the vessel, and having at a first one water separation chamber and one oil collection chamber separated by at least a first Weir plate, wherein the oil collection chamber terminates at the bulkhead. A plurality of outlets is provided for removing sediment, water and oil from the chambers and gas second horizontal flow path.

8 Claims, 3 Drawing Sheets

(51) Int. Cl.
  *B01D 17/02* (2006.01)
  *B01D 19/00* (2006.01)
  *B01D 21/00* (2006.01)

(58) Field of Classification Search
  CPC ............ B01D 17/0211; B01D 17/0214; B01D 19/0042; C02F 1/40; E21B 43/34
  USPC ....... 96/184, 183; 210/521, 532.1, 539, 540, 210/DIG. 5
  See application file for complete search history.

(56) References Cited

U.S. PATENT DOCUMENTS

| | | |
|---|---|---|
| 1,864,511 A | 6/1932 | Jones |
| 1,910,728 A | 5/1933 | Waters |
| 2,009,646 A | 7/1935 | Brady |
| 2,084,958 A | 6/1937 | Hunter |
| 2,349,944 A | 5/1944 | Dixon |
| 2,525,154 A | 10/1950 | Taylor |
| 2,601,903 A | 7/1952 | Erwin |
| 2,657,760 A | 11/1953 | Glasgow |
| 2,710,071 A | 6/1955 | Kinser |
| 2,788,080 A | 4/1957 | Guarin |
| 2,812,034 A | 11/1957 | McKelvey, Jr. |
| 2,844,213 A | 7/1958 | Wilson |
| 2,868,315 A | 1/1959 | Chaple et al. |
| 2,899,014 A | 8/1959 | Sinex |
| RE25,504 E * | 12/1963 | Glasgow ................ C10G 33/06 95/242 |
| 3,364,657 A | 1/1968 | Henderson |
| 3,385,031 A | 5/1968 | McMinn |
| 3,488,926 A | 1/1970 | Gilman |
| 5,064,448 A | 11/1991 | Choi |
| 5,308,384 A | 5/1994 | Kapanen et al. |
| 2016/0008751 A1 | 1/2016 | McKenzie |

OTHER PUBLICATIONS

Petrowiki; "Oil and Gas Separators"; retrieves on Jun. 19, 2017 from http://petrowiki.org/Oil_and_gas_separators.

* cited by examiner

MULTI-PHASE EMULSION SEPARATOR WITH DIRECTED FLOW CHANNELS

FIELD OF THE INVENTION

The invention generally relates to devices to separate emulsions of water, gas, oil, and sediment.

BACKGROUND OF INVENTION

Separators can be used in many configurations and contexts, and most notably as a pressure vessel for separating the various solid, gaseous and liquid components of an on-shore or off-shore well stream. Due to their reliance on gravity for portions of their operations, their components can be arranged in to create a vertical separator, a horizontal separator, or a spherical separator. Two-phase separators divide the liquid from the gas of the emulsion, while three-phase separators also separate water from oil. The functions of the separator may be divided into stages, in which the first stage typically performs primary phase separation, and subsequent stages perform further refinement within the phases.

SUMMARY OF EXEMPLARY EMBODIMENTS OF THE INVENTION

A well flow separator vessel is disclosed having a sediment chamber at the inlet end of the vessel with a knock-down billet, followed by a coalescer and a first horizontal flow path between an upper horizontal divider and a lower horizontal divider extending the cylinder length from the sediment chamber towards the distal end of the vessel. At the far end of the first flow path, gasses are received through a scrubber/demister into a second horizontal flow path between the upper horizontal divider and the top side of the vessel, also extending the cylinder length, except directing flow in the reverse direction back towards the inlet end of the vessel towards a gas outlet. Also at the far end of the first flow path, combined liquids fall into a third horizontal flow path between the lower horizontal divider and the bottom side of the body extending the cylinder length towards the inlet end of the vessel, and having at a first one water separation chamber and one oil collection chamber separated by at least a first Weir plate, wherein the oil collection chamber terminates at the bulkhead. A plurality of outlets is provided for removing sediment, water and oil from the chambers and gas second horizontal flow path.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

The present inventor has devised a new and inventive manner for realizing a separator which saves area on which it is installed (e.g., "footprint") by using directed flow channels, and in particular, by folding back the flow channels at least once along a length of the separator to provide improved separation functionality without increasing the footprint of the separator.

The following and other advantages of embodiments of the present invention over conventional separator designs will be evident from the following description:

Using Directed Flow Channels minimizes free space within the separator vessel, utilizes traditionally unused space, while forcing Oil, Water, and Gas to travel length of vessel more than once to extend travel thus extending retention time and aiding in separation process.

Optional Multi-Stage Water separation allows separation of missed water of initial water separation, allowing for a finer separation and the desired effect of a purer oil at the end of the final separation process.

The addition of multiple Flow Channels and Settling Compartments allow for the minimization of stirring by decreasing velocity of flow to increase settling thus allowing for better separation in each stage.

General Process

A separator according to the present invention provides five stages with three phases, and optionally a fourth phase, as follows:

Phase 1, Stage 1: solids separation, known as a settling compartment in three phase operations;

Phase 2, Stage 2: gas separation from the liquid components;

Phase 3, Stage 3: first stage of water separation from the liquid components;

Phase 3, Stage 4: second stage of water separation from the liquid components; and Phase 4, Stage 5: oil separation.

Figure 3:
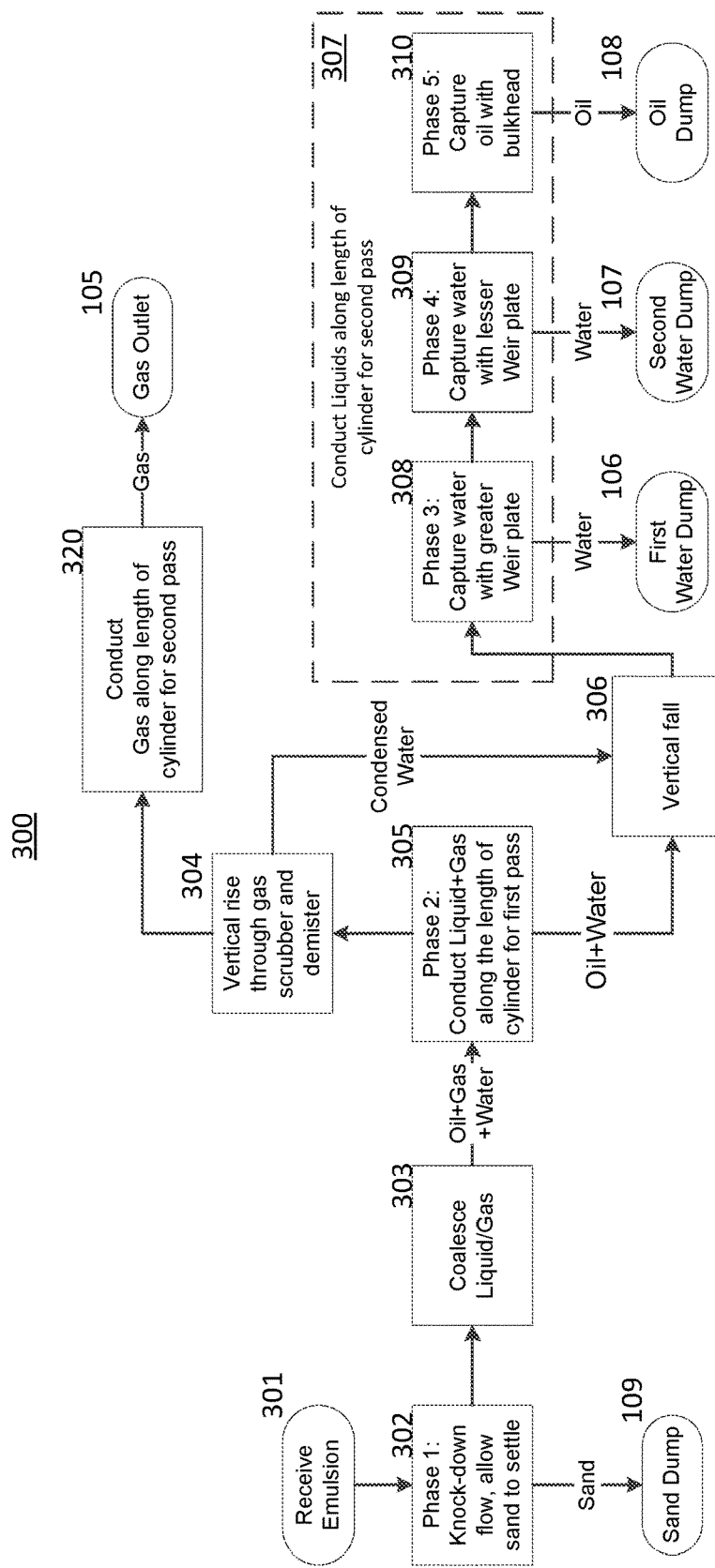
FIG. 3 shows a process flow according to at least one embodiment of the present invention.

FIG. 3 illustrates a process flow diagram (300) according to this outline of functions, including the optional second state of water separation. The emulsion, such as a well stream, is received (301) into the unit via an inlet, and enters into the first phase wherein the flow is knocked-down (302), thereby allowed sediment such as sand to settle into this phase's compartment. A dump with valve (109) to remove the sand may be provided in order to empty this compartment and allow processing to continue.

Next, the remaining liquid/gas combination (303) is directed towards the second phase (305), wherein it is conducted horizontally a first time along the length of the unit through a first flow channel, at the end of which the gas and mist is allowed to rise vertically (304) through a gas scrubber. This rise, according to one embodiment, is simply the distance of the height of the first flow channel, whereupon a 180-degree turn in is forced upon the gas such that it is conducted horizontally (320) at least a second length of the unit, except in a direction towards the inlet to the unit (e.g., "folded back"), after which it is allowed to escape through a gas outlet (105).

Further, at the same point where the gas is allowed to rise, the remaining liquids are allowed to fall vertically (306) and to combine with the condensed mist, where they enter into another fold-back path having two or more stages to separate oil and water. This path also preferably horizontally conducts the length of the unit's cylinder (307), albeit in a direction towards the inlet, through at least a third phase which captures water (308) with a greater Weir plate, and then refines the water capture in an optional fourth phase (309) using a less Weir plate, which yields the separated oil in a fifth phase (310). Water dumps (106, 107) and oil dumps (108) as outlets are provided to remove the separated products from the unit.

Exemplary Mechanical Embodiment

Figure 1:
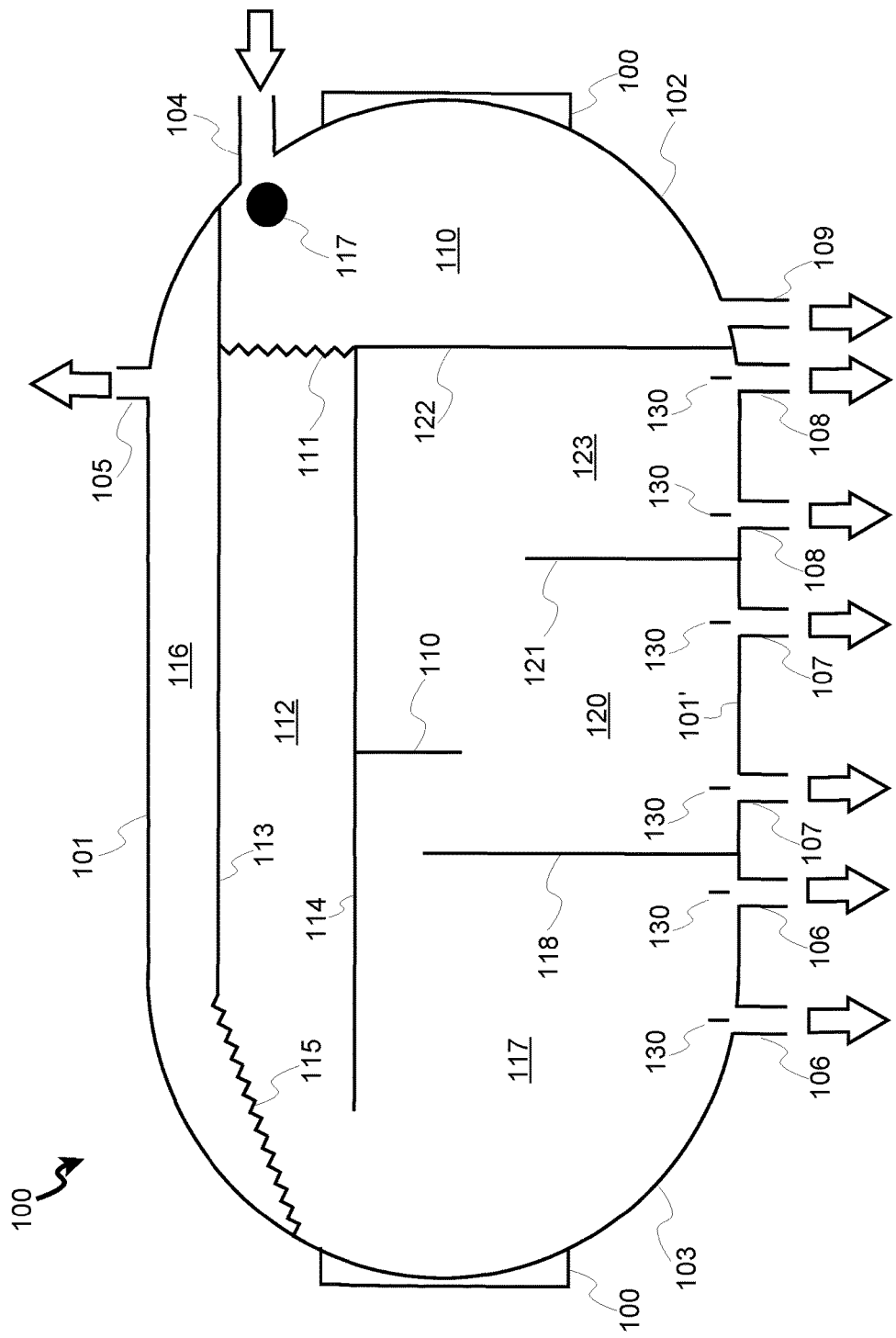
FIG. 1 sets forth a mechanical schematic diagram of a separator vessel according to at least one embodiment of the present invention.

FIG. 1 illustrates the internal schematic or plan (100) for a cylindrical unit according to the present invention. The housing of the unit comprises a hollow cylinder with a top (101) and bottom (101'), wherein gravity attracts from top to bottom, and two end plates, a first at the inlet end (102) and a second at the far end from the inlet (103). One or both ends may be provided with service hatches (100).

The well stream is received at an inlet (104), and a knock down device (117) reduces the flow rate to promote settling of solids such as sand into the first stage (110). Solids can be removed at the solids dump (109).

The liquid-gas combination is now forced through a coalesce (111) into first flow channel (112) to travel horizontally a first time along the length of the cylinder, until it reaches the distal end (103) of the unit. There, the gasses are allowed to rise through a gas scrubber and demister (115), and the liquids are allowed to fall towards a first water separation phase.

The flow for the gasses is then folded-back to a second horizontal path (116) to travel along the length of the cylinder towards a gas outlet (105) which is proximal to the input end (102). This is the first fold-back path within the unit.

A second fold-back path is provided below the first channel (112), in which one (117), or preferably two (120), stages of water separation occur using a greater Weir (118) and a lesser Weir (121) plates. Condensed (demisted) water also falls into the first water phase (117). A surge plate (110) may be utilized after the greater Weir plate (118) in some configurations. Finally, a stage (123) for collecting the remaining oil is provided after the water separation stage(s), which in this exemplary design, is separated from the sediment stage (110) by a bulkhead (122). Outlets (dumps) for water (106, 107) and oil (108) are provided, preferably with vortex breakers in some configurations.

Figure 2:
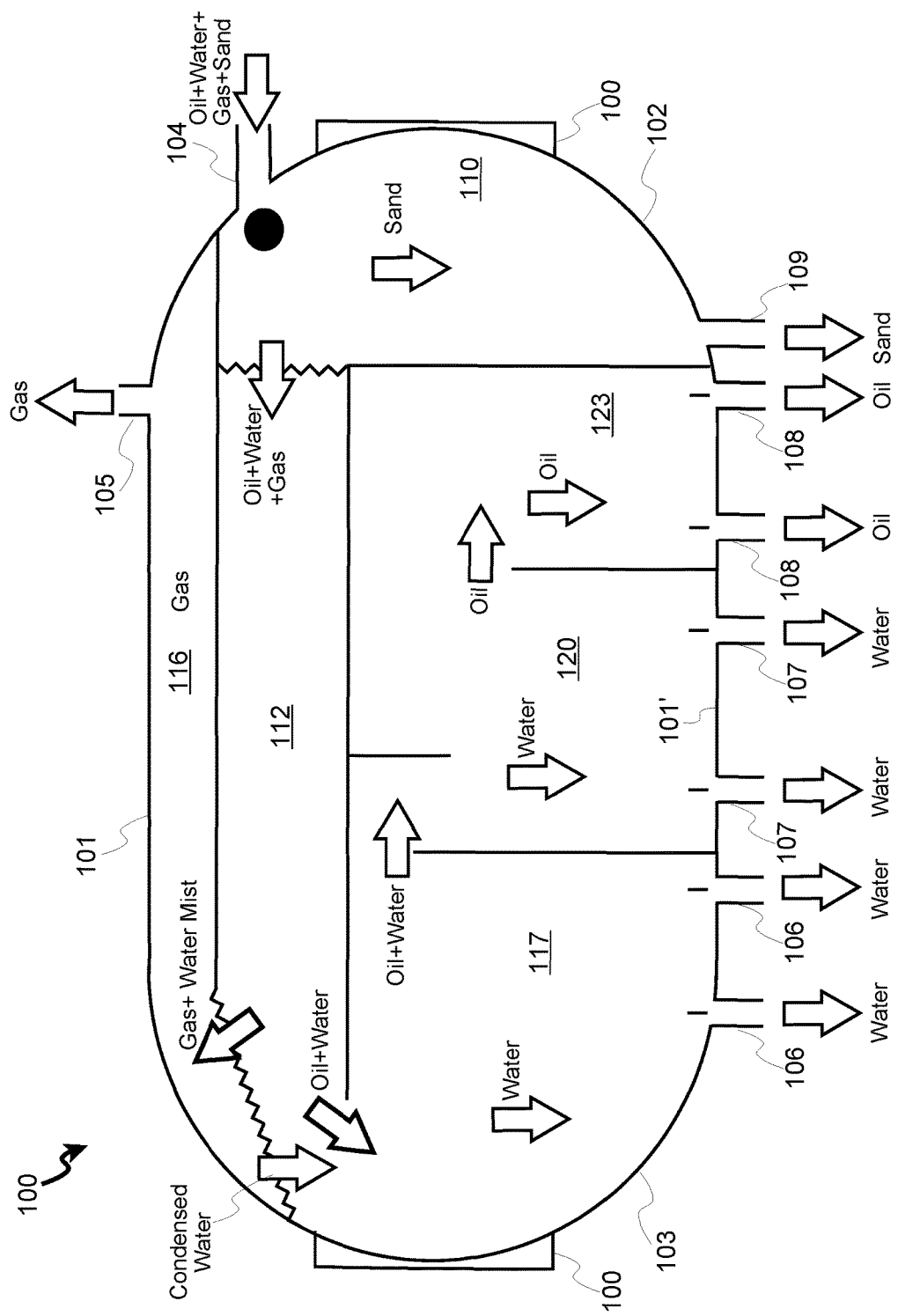
FIG. 2 provides the same schematic of FIG. 1, except with annotations to more clearly illustrate the directed flow of gasses and liquids through the vessel.

FIG. 2 illustrates the same exemplary embodiment, with more details of the three directed flow channels, two of which are fold-back paths along the horizontal length of the cylinder to promote greater separation functionality but minimize the unit's foot print. The first directed flow path passes from the inlet end to the distal end of the unit through the first stage (112). Then, two fold-back paths follow, one for gasses (116) conducted horizontally above the first flow path in the reverse direction towards the inlet end, and one for liquids (117, 120, 123), conducted horizontally below the first flow path in the reverse direction towards the inlet end. In this manner, the physical length of the cylinder is used for three flow paths, matching the performance of a unit up to three times the unit's actual outside length dimension, thereby conserving area occupied by the unit to allow for tighter integration with other oil well components.

Details of Stages and Phases

Phase 1 Stage 1. In four phase operations, combined flow from the well enters the separator and is knocked down with knockdown billet into Sand/Solids Settling Compartment. Sand/Solids settle to bottom of Sand/Solids Settling Compartment allowing continued flow of Oil, Water, Gas to Directed Flow Channel. It three phase operations, the combined flow from the well enters the separator and is knocked down with knockdown billet into Settling Compartment. Initial Settling compartment decreases velocity of high pressure flow by changing direction of flow to allow for better settling and less agitation. After initial settling Oil, Water, Gas continues to the first Directed Flow Channel.

Phase 2 Stage 2. The combined flow of Oil, Water, and Gas travels through the first Directed Flow Channel through the full length of vessel extending retention time by utilizing critical unused space in traditional separators. At this time Oil, Water, Gas start the settling and separation process. At the end of the first Directed Flow Channel travel, Gas rises up through to Directed Gas Flow Channel and to Gas Outlet while combined fluids fall to start the next stage of separation.

Phase 3 Stage 3. The combined flow of Oil and Water starts the separation process in the first (course) water separation compartment. In this compartment, the bulk of water is separated and discharged from the vessel via dump line(s) allowing remaining Water and Oil to flow over a first (greater) Weir Plate to the optional second water compartment.

Phase 3 Stage 4. The combined flow of remaining Water and Oil finish the separation process in the optional second (fine) water separation compartment allowing a total separation and removal of remaining water not caught by previous separation stages. Separated Water will be discharged via dump line allowing fully separated oil to flow over a second (lesser) Weir Plate to the Oil compartment.

Phase 4 Stage 5. The Oil has now been separated through the previous stages of separation, and it is collected and discharged via dump line completing the separation process.

SUMMARY

The foregoing exemplary embodiments are intended to teach how to make and use the invention, but not to express the limits of the spirit and scope of the invention. In some embodiments, a disclosed singular element may be replaced by a plurality of elements, and vice versa, without departing from the spirit and scope of the invention. Alternative materials from those disclosed in the exemplary embodiments may be employed, so long as the function and intended performance is maintained or improved.

What is claimed is:

1. A separating vessel comprising:
    a horizontally-oriented cylindrical body having a horizontal length, a top side and a bottom side;
    a first end cap on the body, having an inlet for receiving a well stream;
    a second end cap at a distal end of the body from the first end cap;
    a first chamber formed between the first end cap and a bulkhead, in fluid communication to the inlet, and having a flow knock-down billet for causing solids in the received well stream to settle into the first chamber;
    a first horizontal flow path defined by an upper horizontal divider and a lower horizontal divider, the first horizontal flow path extending a cylinder length from the first chamber towards the second end cap, having a coalescer disposed between the first chamber and the first horizontal path to prevent solids in the well stream from entering the first horizontal flow path;
    a second horizontal flow path defined by the upper horizontal divider and the top side of the body, the second horizontal flow path extending the cylinder length from the first horizontal flow path towards the first end cap, having a gas scrubber and demister disposed between the first horizontal path and the second horizontal flow path to prevent liquids from rising into the second horizontal flow path, to allow gasses to rise into the second horizontal flow path, and to condense vaporous water;

a third horizontal flow path defined by the lower horizontal divider and the bottom side of the body, the third horizontal flow path extending the cylinder length from the first horizontal flow path towards the first end cap, having at a first one water separation chamber and one oil collection chamber separated by at least a first Weir plate, wherein the oil collection chamber terminates at the bulkhead; and a plurality of outlets in fluid communication with the third horizontal flow path for removing sediment, water and oil, and at least one outlet in gaseous communication with the second horizontal flow path for removing gasses.

2. The separator vessel as set forth in claim 1 wherein the third horizontal flow path further comprises a second water separation chamber formed between the first Weir plate and a second Weir plate, wherein the oil collection chamber is defined by the second Weir plate and the bulkhead, and wherein the first Weir plate is taller than the second Weir plate.

3. The separator vessel as set forth in claim 2 wherein the second water separation chamber further comprises a surge plate depending downwards from the lower horizontal divider.

4. The separator vessel as set forth in claim 1 wherein one or more of the outlets are provided with a vortex breaker.

5. A method of manufacture for a separating vessel comprising:

providing to a horizontally-oriented cylindrical body having a horizontal length, a top side and a bottom side:
  a first end cap on the body, having an inlet for receiving a well stream; and
  a second end cap at a distal end of the body from the first end cap;

forming a first chamber between the first end cap and a bulkhead within the cylindrical body, the first chamber being in fluid communication to the inlet;

installing a flow knock-down billet into the first chamber for causing solids in the received well stream to settle into the first chamber;

forming a first horizontal flow path by installing an upper horizontal divider and a lower horizontal divider within the cylindrical body, the first horizontal flow path extending a cylinder length from the first chamber towards the second end cap;

installing a coalescer between the first chamber and the first horizontal path to prevent solids in the well stream from entering the first horizontal flow path;

forming a second horizontal flow path between the upper horizontal divider and the top side of the cylindrical body, the second horizontal flow path extending the cylinder length from the first horizontal flow path towards the first end cap;

installing a gas scrubber and demister between the first horizontal path and the second horizontal flow path to prevent liquids from rising into the second horizontal flow path, to allow gasses to rise into the second horizontal flow path, and to condense vaporous water;

forming a third horizontal flow path between the lower horizontal divider and the bottom side of the cylindrical body, the third horizontal flow path extending the cylinder length from the first horizontal flow path towards the first end cap;

forming in the third horizontal flow path at a first one water separation chamber and one oil collection chamber separated by at least a first Weir plate, wherein the oil collection chamber terminates at the bulkhead; and installing a plurality of outlets for removing sediment, water and oil from the chambers of the third horizontal flow path and gasses from the second horizontal flow path.

6. The method of manufacture for a separator vessel as set forth in claim 5 wherein the third horizontal flow path further fitted with a second water separation chamber formed between the first Weir plate and a second Weir plate, wherein the oil collection chamber is defined by the second Weir plate and the bulkhead, and wherein the first Weir plate is taller than the second Weir plate.

7. The method of manufacture for a separator vessel as set forth in claim 6 wherein the second water separation chamber is provided a surge plate depending downwards from the lower horizontal divider.

8. The method of manufacture for a separator vessel as set forth in claim 5 wherein one or more of the outlets are provided with a vortex breaker.

* * * * *